· US007343297B2

(12) United States Patent
Bergler et al.

(10) Patent No.: US 7,343,297 B2
(45) Date of Patent: Mar. 11, 2008

(54) SYSTEM AND RELATED METHODS FOR MANAGING AND ENFORCING SOFTWARE LICENSES

(75) Inventors: Peter M. Bergler, Seattle, WA (US); John E. Parsons, Jr., Redmond, WA (US); Breen E. Hagan, Seattle, WA (US); Tad Dennis Brockway, Redmond, WA (US); Robert K. Leitman, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 09/882,610

(22) Filed: Jun. 15, 2001

(65) Prior Publication Data

US 2002/0194010 A1 Dec. 19, 2002

(51) Int. Cl.
G06Q 10/10 (2006.01)
(52) U.S. Cl. ............................................. 705/1; 705/59
(58) Field of Classification Search ................... 705/1, 705/52
See application file for complete search history.

(56) References Cited

U.S. PATENT DOCUMENTS

| 4,924,378 | A | 5/1990 | Hershey et al. |
| 5,138,712 | A | 8/1992 | Corbin |
| 5,204,897 | A | 4/1993 | Wyman |
| 5,343,524 | A | 8/1994 | Mu et al. |
| 5,390,297 | A | 2/1995 | Barber et al. |
| 5,553,143 | A | 9/1996 | Ross et al. |
| 5,671,412 | A | 9/1997 | Christiano |
| 5,724,425 | A | 3/1998 | Chang et al. |
| 5,745,879 | A | * 4/1998 | Wyman ........................... 705/1 |

(Continued)

FOREIGN PATENT DOCUMENTS

JP 05346851 A * 12/1993

OTHER PUBLICATIONS

Proquest article; InfoWorld; "Microsoft drops office concurrent licensing." Nov. 10, 1997.*

(Continued)

*Primary Examiner*—John G. Weiss
*Assistant Examiner*—Traci L Casler
(74) *Attorney, Agent, or Firm*—Lee & Hayes, PLLC

(57) ABSTRACT

A system and method for managing and enforcing software licenses through automating per-seat software licensing using a "leased license" approach provides vendors with the assurance that purchasers are complying with software licenses while maximizing a customer's use of purchased software licenses. Licenses are automatically enforced by expiring leased licenses and making the expired licenses available again for use by client computers. A system includes a licensing clearinghouse, a license server, clients, and terminal servers. A terminal server assists a client in obtaining a license with an expiration date from a license server, and helps maintain the client's license status through license requests to the license server. Licenses that expire are recycled and made available again to clients. Prior to expiring, licenses are automatically updated during a license update period, and if a license is lost, a temporary license is issued. After the license update period, clients may receive a license update or a new license. Temporary licenses are replaced with permanent licenses that are returned to the available license pool, thus netting out the overall distribution of purchased licenses and assuring that a customer's use of purchased licenses in not lost.

4 Claims, 6 Drawing Sheets

U.S. PATENT DOCUMENTS

| | | | |
|---|---|---|---|
| 5,752,041 | A | 5/1998 | Fosdick |
| 5,790,677 | A | 8/1998 | Fox et al. |
| 6,005,935 | A | 12/1999 | Civanlar |
| 6,023,766 | A * | 2/2000 | Yamamura .................. 713/201 |
| 6,049,612 | A | 4/2000 | Fielder |
| 6,056,786 | A | 5/2000 | Rivera et al. |
| 6,105,069 | A | 8/2000 | Franklin et al. |
| 6,188,995 | B1 | 2/2001 | Garst et al. |
| 6,189,146 | B1 * | 2/2001 | Misra et al. ................. 717/177 |
| 6,233,567 | B1 | 5/2001 | Cohen |
| 6,343,280 | B2 | 1/2002 | Clark et al. |
| 2003/0160823 | A1 * | 8/2003 | Stannard ..................... 345/764 |

OTHER PUBLICATIONS

French et al., "Software License Management in a Network Environment," Proceedings, UNIX Security Workshop, Aug. 1988, pp. 68-69.

Soref et al., "Electronic Software Distribution," Dr. Dobb's Journal, vol. 25, No. 9, Sep. 2000, pp. 100, 102-106.

Wilson, "Sofware Security and the DirectPlay API," Dr Dobb's Journal, vol. 22, No. 4, Apr. 1997, pp. 66, 68-69, 80-82.

Kirkman, "Content License and Linking Agreements," WEB Techniques, vol. 3, No. 2, Feb. 1998, pp. 8, 20.

Lent, "This Market Needs A New Look," Information WEEK, No. 474, May 9, 1994, pp. 60-62, 64, 68.

Giorgis, "Tame the Network", BYTE, vol. 21, No. 1, Jan. 1996, pp. 147-148, 150-151.

Watanabe, "Download Licenser System," Matusushita Technical Journal, vol. 44, No. 5, Oct. 1988, pp. 34-37 ( INSPECT abstract only).

Plummer, "Software Licensing for the Corporate LAN-the Licensing Challenge," Business Continuity, vol. 15, No. 2, pp. 23-24 (abstract only).

U.S. Appl. No. 09/724,703, entitled "System and Method for Software Licensing," naming the inventors of Misra et al., filed Nov. 28, 2000 ( which is a continuation of U.S. Patent No. 6,189,146), copy not included.

U.S. Appl. No. 11/016,641, entitled "System and Method for Software Licensing," naming the inventors of Misra et al., fiiled on Dec. 17, 2004 (which is a continuation of U.S. Patent No. 6,189,146), copy not included.

* cited by examiner

SYSTEM AND RELATED METHODS FOR MANAGING AND ENFORCING SOFTWARE LICENSES

RELATED APPLICATIONS

The following patent application is related to the present application, is assigned to the assignee of this patent application, and is expressly incorporated by reference herein:

U.S. patent application Ser. No. 09/040,813, entitled "System and Method for Software Licensing", filed on Mar. 18, 1998.

TECHNICAL FIELD

This invention generally relates to the management and enforcement of software licenses, and, more particularly, to a system and methods for automatically managing and enforcing terminal server software licenses through a "leased license" approach.

BACKGROUND

Software licensing has historically been based on a "trust" model in which the user (i.e., licensee) is presumed to be honest and trustworthy and to abide by the terms of the license. Under the trust model, a software license typically accompanies a software product to explain the terms of use. For instance, the software license might dictate that the program code is to be installed on only one computer, and may be used to make one backup copy.

Common types of licenses include "shrink wrap" licenses, "online" licenses, and "site" licenses. A "shrink wrap" license is a license that accompanies each software product that is sold individually in a shrink-wrapped package through, for example, retail stores. The user is typically assumed to accept the terms of the shrink wrap license upon breaking the seal of the package, or the container that holds the disk itself.

An "online" license is one that accompanies software products that are downloaded online, such as from the Internet. The license is typically presented to the user prior to downloading the code. The user is presented with a choice to accept or reject the license. If the user accepts the license (e.g., by clicking an "Accept" button on the screen), the user is presumed to have accepted the terms of the license and the code is downloaded to the user's computer.

A "site" license is a single license that allows installation of multiple copies of software on many different computers at a particular site or many sites. It is commonly used to sell software to corporations, firms, or other entities having many computers. The purchaser pays for a certain number of copies (e.g., hundreds or thousands), and the site license enables the purchaser to install that number of copies on its computers. The site license is beneficial because the software vendor need not supply a large number of program disks, but merely supplies one or a few copies of the software and lets the purchaser install the copies without violating the agreement.

Unfortunately, enforcing each of the above licenses is impractical, if not impossible in certain situations. Users may, purposefully or inadvertently, make multiple copies of the software code and install it on more computers than the license allows. Yet, software vendors have difficulty monitoring these abuses because they occur in the privacy of the home or company. Thus, it is believed that the software industry loses a large percentage of revenues each year simply due to illegitimate use of software by the licensees.

Another problem with conventional software licensing practices concerns internal monitoring and bookkeeping on the part of large-site licensees. In most cases, the licensees want to comply with the terms of the software licenses, but are unable to adequately track the software as it is used throughout the site. For example, a large corporation might purchase several thousand copies of the software and begin installing the copies. However, computers and personnel change over time and it is difficult to centrally monitor how many copies have been installed, whether the copies have expired, whether they need upgrading, and so forth.

A type of "per-seat" or "per-device" software licensing is terminal server licensing, which provides remote clients with access to terminal server resources such as remotely executable software applications. Terminal server technology, such as that made available by the Windows® 2000 Terminal Services product from Microsoft Corporation of Redmond, Wash., allows a wide variety of different client computer devices including personal desktop computers, laptop computers, notebook computers, handheld computers, Apple Macintosh workstations, UNIX workstations, and the like, to remotely execute applications on a terminal server over virtually any type of network connection. Terminal server licensing permits the monitoring and distribution of purchased software licenses and thus prevents the abuse by users who would make multiple copies of software code and install it on more computers than a license allows.

One method of per-seat terminal server licensing involves the use of a licensing clearinghouse through which customers purchase software licenses which are sent to license servers that maintain an inventory of available software licenses. The license server is responsible for distributing the software licenses to individual clients. It monitors the software licenses that have been granted to clients and continues to distribute licenses as long as non-assigned licenses remain available. Once the supply of non-assigned licenses is exhausted, however, the license server can no longer grant licenses to the clients, and the customer must purchase additional licenses from the license clearinghouse.

Per-seat terminal server licensing is typically enforced (e.g., in the Windows® 2000 Terminal Services product) by putting a "ticket" onto a client machine that indicates the machine is licensed to access the terminal server. When an unlicensed machine talks to a terminal server, the terminal server attempts to get a license for the machine through the license server. The license server provides the "ticket" which gets pushed down onto the client machine, presumably to remain there permanently, so that whenever that particular client machine connects to a terminal server, the terminal server recognizes it as having a license because of its "ticket".

Although this method of licensing avoids some of the problems encountered in the conventional software licensing schemes described above, such as the abuse by users who make multiple copies of software code and install it on more computers than a license allows, and difficulties with internal monitoring and bookkeeping on the part of large-site licensees, various disadvantages remain.

For example, loss of the per-seat licensing information, or the "ticket", on a client machine, results in various problems. Loss of the "ticket" on a client machine may occur because of a hardware or software failure, but typically is the result of reinstalling the operating system, reformatting the hard drive, or otherwise refreshing the system prior to giving the machine to a new employee after a previous employee leaves. Once the client machine loses its "ticket", and then attempts to access a terminal server, the terminal server won't recognize the machine as having a license and will attempt to get a new license from the license server. If the license server has available licenses, it will provide a new "ticket" for the client machine. If not, the machine will not be able to connect to the terminal server. At some point, due to employee turnover and other factors, this process leads to a depletion of a customer's available pool of purchased licenses. The result is that the customer must either purchase extra licenses and make them available on the license server, or attempt to recover the use of prior licenses which became unusable when the original client machines on which they resided were refreshed. The disadvantages of this licensing method therefore include multiple licenses being issued to the same client machine, customers paying for extra licenses which are not being used, and customers having to go through the manual and arduous task of contacting the license clearinghouse and having prior lost licenses made available again on the license server for distribution to client machines.

Accordingly, the need exists for a new approach in managing and enforcing per-seat terminal server software licenses that assists customers in monitoring their own compliance with licensing agreements, ensures that customers comply with licensing agreements, prevents customers from paying for extra licenses that are not needed, and automates the process of reviving lost licenses to avoid the manual task of reclaiming lost licensees through the license clearinghouse.

SUMMARY

This invention concerns a system and method for managing and enforcing software licenses through automating per-seat software licensing using a "leased license" approach. In addition to providing vendors with the assurance that purchasers are complying with software licenses, the invention maximizes a customer's use of purchased software licenses while eliminating the difficulties previously associated with a customer monitoring its own compliance with software licenses.

The invention provides a way to enforce permanent licenses automatically by repetitively expiring leased licenses and making those expired licenses available again for use by individual client computers. An exemplary system includes a licensing clearinghouse which generates valid software licenses, a license server which maintains and distributes an inventory of software licenses purchased from the licensing clearinghouse, and multiple clients located at or affiliated with a customer company or other customer entity.

Terminal servers may act as intermediaries for clients that might not have network connectivity to the license server. In addition to acting as common servers that provide resources to clients, terminal servers include the ability to facilitate connectivity to the license server for purposes of distributing software licenses to the clients. Individual clients include various computing devices, such as desktop personal computers, workstations, laptop computers, notebook computers, handheld PCs, and the like, in addition to simpler, low cost machines or terminal devices having limited local processing and local memory.

In an exemplary system, a company purchases software licenses through a licensing clearinghouse. A license generator at the licensing clearinghouse creates a license pack containing a set of one or more individual software licenses. The license generator verifies the license pack for installation on a license server and sends the license pack to the license server using standard communications. The license server is responsible for maintaining an inventory of software licenses that have been purchased from the licensing clearinghouse and distributing the licenses to individual clients.

In a first implementation of the invention, when a client connects to a terminal server, the terminal server determines whether the client has been issued a license. If the client has not been issued a license, the terminal server assists the client in obtaining a license from a license server. If a license server is not available, the client is denied access to the terminal server resources. Assuming a license server is available and has an available license, the license is issued and pushed down to the client. Although the license is a permanent license, the license server assigns a random expiration date to the license. Thereafter, each time the client connects to the terminal server prior to the expiration date of the license, the client is permitted access to the server. When the client connects to the terminal server on or after the expiration date, the terminal server submits a license request to the license server. If the license server has an available license, it issues the available license with a new expiration date, and pushes the license down to the client. If the license server does not have an available license, no license is issued, and the client is denied access to the terminal server.

In addition, the license server automatically returns the original license to its pool of available licenses on the expiration date of the license. Thus, in the first implementation of the invention, upon connecting with the terminal server on or after the expiration date, the client will be issued the same license it was originally issued having a new expiration date, and therefore maintain accessibility to the terminal server. A benefit of the invention is therefore made clear by the scenario in which the client computing device loses its original license due to, for example, wiping the hard drive when a new employee is assigned to the client computing device. Where prior licensing schemes require human intervention to reactivate the lost license, the invention automatically makes the lost license available again for use by a client on the expiration date of the license.

Additional and more comprehensive implementations of the invention facilitate a more realistic network computing environment in which numerous clients are vying for the available licenses from a license server's pool. A first example includes the license server issuing a temporary license to a client when the license server does not have an available permanent license. This situation arises when a client loses its permanent license prior to the license expiration date. In this case, when the client connects to a terminal server, the terminal server makes a license request to the license server, and the license server issues a temporary license with a temporary period which provides access to the terminal server for the client. Thereafter, each time this client connects to the terminal server during the temporary period, the terminal server requests a permanent license from the license server to replace the temporary license. Therefore, once the client's lost license reaches its expiration date and is automatically returned to the license server's available pool, the license server sets a new expiration date and pushes this same license down to the client the next time the client connects to the terminal server, thus replacing the client's temporary license. This assumes that the temporary license has not already been replaced by a new license prior to the expiration of the lost license. Only if the license server fails to acquire an available license by the end of the temporary period, will the client be denied access to the terminal server. Thus, as licenses from additional clients expire and are returned to the available pool, a given client will receive a license prior to the end of the temporary period, and not be denied access to the terminal server.

In yet another implementation, a license update period is additionally provided in which the terminal server assists a client in renewing the client's current permanent license prior to the expiration date of the license. During the update period, each time the client connects to the terminal server, the terminal server submits a license update request to the license server. If the issuing license server is available, it will recognize the client as already having a valid license which needs an updated expiration date. The license server will then update the expiration date and provide this "same" license back to the client. If the license server is not available, the client is permitted access to the terminal server since its current license has not yet expired. If the client has not renewed its license in this manner by the expiration date of the license, then the license server will provide a new license to the client as described above, and the client should continue to have terminal server access.

Thus, through leasing licenses to clients and continually expiring and releasing them in a way that nets out the overall distribution of purchased licenses, customers will not lose the use of licenses that are wiped off of client computers due to events such as employee turnovers, and vendors will be assured that their licenses are enforced since the licenses cannot be improperly transferred or otherwise violated.

BRIEF DESCRIPTION OF THE DRAWINGS

The same reference numbers are used throughout the drawings to reference like components and features.

DETAILED DESCRIPTION

Exemplary System for Software Licensing

Figure 1:
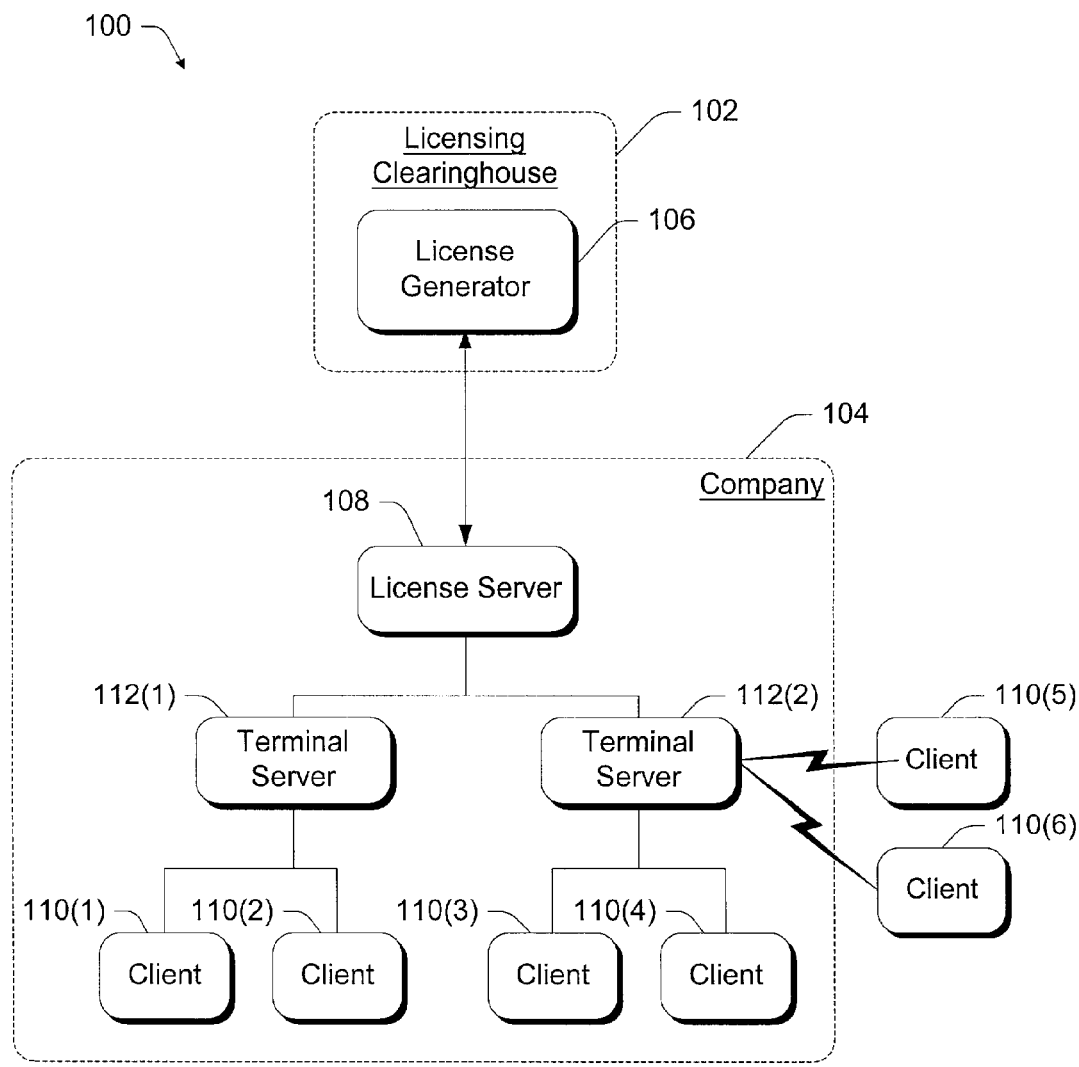
FIG. 1 illustrates an exemplary system for licensing software.

FIG. 1 illustrates an exemplary system 100 for licensing software in which the invention may be implemented. Aspects of the exemplary system 100 not fully developed in the following description are described in more detail in the co-pending patent application entitled, "System and Method for Software Licensing", incorporated by reference above.

The system 100 has a licensing clearinghouse 102 that creates and issues valid software licenses to one or more companies, firms, agencies, or other entities, as represented by company 104. In a particular embodiment, the clearinghouse 102 is a separate entity from the company 104. Examples of the clearinghouse 102 include a software manufacturer, a software vendor, or a third party agent that is authorized to issue software licenses on behalf of the software manufacturer or vendor.

In general, the exemplary system 100 allows a company 104 to purchase software licenses through the licensing clearinghouse 102 so that it may run software on company servers or computers. A license generator 106 at the clearinghouse 102 creates a "license pack" containing a set of one or more individual software licenses. The license generator 106 sends the license pack to a license server 108 using standard communications, such as a data communication network (e.g., Internet) or a portable data medium (e.g., floppy diskette, CD-ROM, etc.). The license generator 106 prevents the license pack from being copied and installed on multiple license servers 108 through a method of assigning a unique ID to the license pack, associating the ID with a license server 108, digitally signing the license pack, and encrypting the license pack with a license server's public key, as described in detail in the co-pending patent application entitled, "System and Method for Software Licensing", incorporated by reference above.

The company 104 has at least one designated license server 108. The license server 108 maintains an inventory of software licenses purchased from the licensing clearinghouse 102 and distributes the software licenses contained in the license pack to individual clients, as represented by clients 110(1)-110(6). The license server 108 monitors the software licenses that have been granted to clients 110 and generally distributes licenses to new clients 110 as long as it has available non-assigned licenses.

Because clients 110 might not have direct access to the license server 108, one or more terminal servers, as represented by servers 112(1) and 112(2), can act as an intermediary for the clients 110. Each terminal server 112 is a common server that provides conventional resources to the clients 110. In addition, each terminal server 112 is coupled to the license server 108 to facilitate license distribution from the license server 108 to the clients 110.

The clients 110 may be directly coupled to the terminal servers 112 via a LAN (local access network) or WAN (wide area network), as represented by clients 110(1)-110(4), or by any other communication link. Additionally, the clients 110 may be indirectly coupled to the terminal servers 112 through a dialup connection as represented by clients 110(5) and 110(6).

Exemplary Computer Used to Implement Servers and/or Clients

The license generator 106, license server 108, and terminal server 112 of FIG. 1, are preferably implemented as computer servers, such as Windows NT® operating system servers from Microsoft Corporation, or UNIX-based servers. It is noted however, that the license generator 106 and license server 108 may be implemented using other technologies, including mainframe technologies, as long as they share a secure, inter-operable communication mechanism such as remote procedure call (RPC).

Individual clients 110 may be implemented as various computing devices, such as desktop personal computers, workstations, laptop computers, notebook computers, handheld PCs, and the like. The clients 110 may further represent a terminal device, which is a low cost machine with limited local processing and local memory. The terminal device includes a display, a keyboard, an optional mouse, limited computer resources such as memory, and enough intelligence to connect to a terminal server 112. The terminal device merely provides a connection point to the server-based processing.

The clients 110 might also represent a network-centric computer, such as a Network Computer (or NC) or a Net PC.

Figure 2:
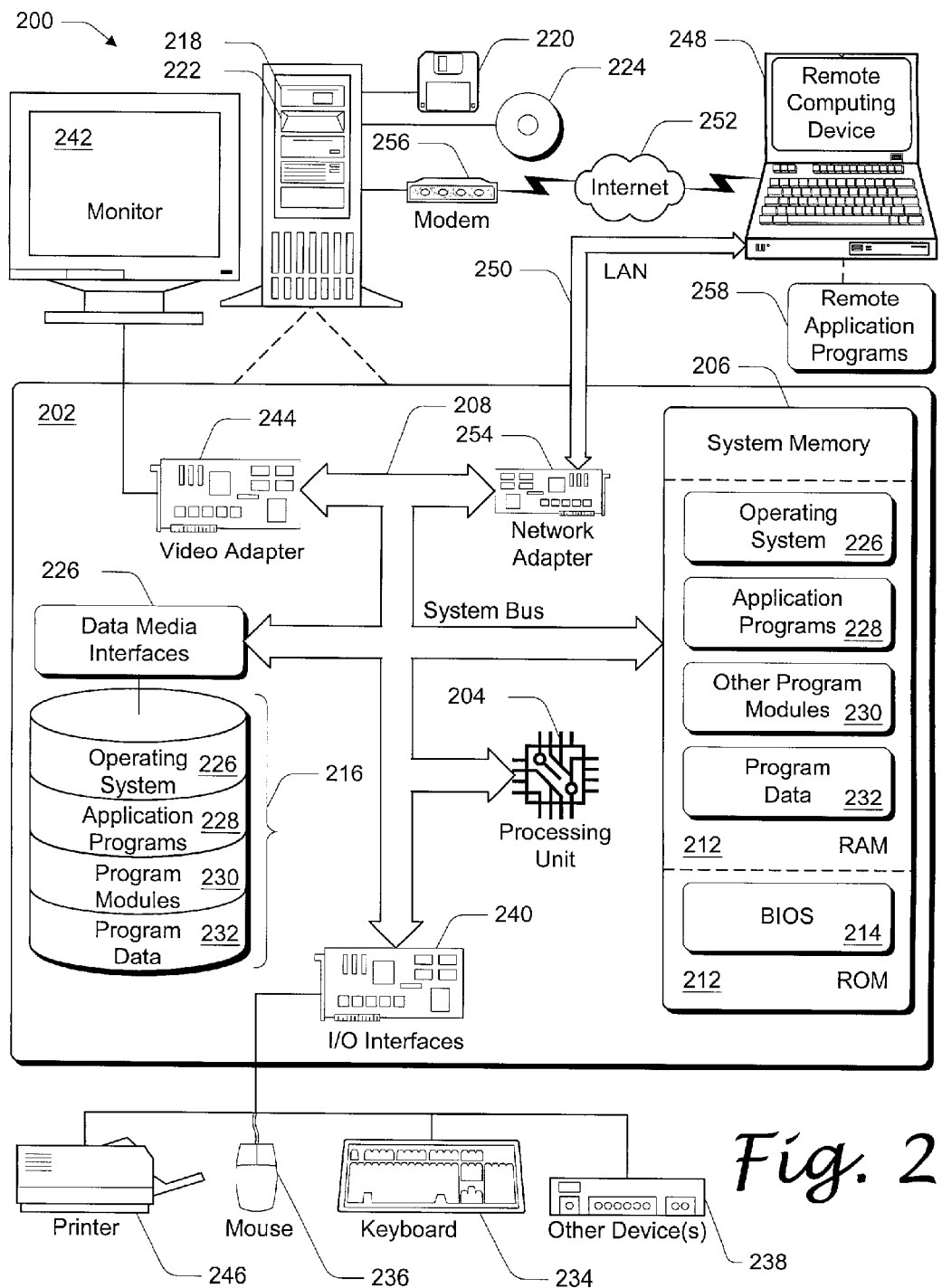
FIG. 2 illustrates an exemplary computing environment which is suitable for implementing various computing devices within the software licensing system.

FIG. 2 illustrates an example of a computing environment 200 which is suitable for implementing, either fully or partially, computer and network architectures described herein, such as the client 110, license generator 106, license server 108, and terminal server 112. The exemplary computing environment 200 is only one example of a computing system, and is not intended to suggest any limitation as to the scope of use or functionality of the network architectures. Neither should the computing environment 200 be interpreted as having any dependency or requirement relating to any one or combination of components illustrated in the exemplary computing environment 200.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Caching user network access information may be described in the general context of computer-executable instructions, such as program modules, being executed by a computer. Generally, program modules include routines, programs, objects, components, data structures, etc. that perform particular tasks or implement particular abstract data types. Caching network access information may also be practiced in distributed computing environments where tasks are performed by remote processing devices that are linked through a communications network. In a distributed computing environment, program modules may be located in both local and remote computer storage media including memory storage devices.

The computing environment 200 includes a general-purpose computing system in the form of a computer 202. The components of computer 202 can include, but are not limited to, one or more processors or processing units 204, a system memory 206, and a system bus 208 that couples various system components including the processor 204 to the system memory 206.

The system bus 208 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 202 typically includes a variety of computer readable media. Such media can be any available media that is accessible by computer 202 and includes both volatile and non-volatile media, removable and non-removable media. The system memory 206 includes computer readable media in the form of volatile memory, such as random access memory (RAM) 210, and/or non-volatile memory, such as read only memory (ROM) 212. A basic input/output system (BIOS) 214, containing the basic routines that help to transfer information between elements within computer 202, such as during start-up, is stored in ROM 212. RAM 210 typically contains data and/or program modules that are immediately accessible to and/or presently operated on by the processing unit 204.

Computer 202 can also include other removable/non-removable, volatile/non-volatile computer storage media. By way of example, FIG. 5 illustrates a hard disk drive 216 for reading from and writing to a non-removable, non-volatile magnetic media (not shown), a magnetic disk drive 218 for reading from and writing to a removable, non-volatile magnetic disk 220 (e.g., a "floppy disk"), and an optical disk drive 222 for reading from and/or writing to a removable, non-volatile optical disk 224 such as a CD-ROM, DVD-ROM, or other optical media. The hard disk drive 216, magnetic disk drive 218, and optical disk drive 222 are each connected to the system bus 208 by one or more data media interfaces 226. Alternatively, the hard disk drive 216, magnetic disk drive 218, and optical disk drive 222 can be connected to the system bus 208 by a SCSI interface (not shown).

The disk drives and their associated computer-readable media provide non-volatile storage of computer readable instructions, data structures, program modules, and other data for computer 202. Although the example illustrates a hard disk 216, a removable magnetic disk 220, and a removable optical disk 224, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 216, magnetic disk 220, optical disk 224, ROM 212, and/or RAM 210, including by way of example, an operating system 226, one or more application programs 228, other program modules 230, and program data 232. Each of such operating system 226, one or more application programs 228, other program modules 230, and program data 232 (or some combination thereof) may include an embodiment of a caching scheme for user network access information.

Computer system 202 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 202 via input devices such as a keyboard 234 and a pointing device 236 (e.g., a "mouse"). Other input devices 238 (not shown specifically) may include a microphone, joystick, game pad, satellite dish, serial port, scanner, and/or the like. These and other input devices are connected to the processing unit 604 via input/output interfaces 240 that are coupled to the system bus 208, but may be connected by other interface and bus structures, such as a parallel port, game port, or a universal serial bus (USB).

A monitor 242 or other type of display device can also be connected to the system bus 208 via an interface, such as a video adapter 244. In addition to the monitor 242, other output peripheral devices can include components such as speakers (not shown) and a printer 246 which can be connected to computer 202 via the input/output interfaces 240.

Computer 202 can operate in a networked environment using logical connections to one or more remote computers, such as a remote computing device 248. By way of example, the remote computing device 248 can be a personal computer, portable computer, a server, a router, a network computer, a peer device or other common network node, and the like. The remote computing device 248 is illustrated as a portable computer that can include many or all of the elements and features described herein relative to computer system 202.

Logical connections between computer 202 and the remote computer 248 are depicted as a local area network (LAN) 250 and a general wide area network (WAN) 252. Such networking environments are commonplace in offices, enterprise-wide computer networks, intranets, and the Internet. When implemented in a LAN networking environment, the computer 202 is connected to a local network 250 via a network interface or adapter 254. When implemented in a WAN networking environment, the computer 202 typically includes a modem 256 or other means for establishing communications over the wide network 252. The modem 256, which can be internal or external to computer 202, can be connected to the system bus 208 via the input/output interfaces 240 or other appropriate mechanisms. It is to be appreciated that the illustrated network connections are exemplary and that other means of establishing communication link(s) between the computers 202 and 248 can be employed.

In a networked environment, such as that illustrated with computing environment 200, program modules depicted relative to the computer 202, or portions thereof, may be stored in a remote memory storage device. By way of example, remote application programs 258 reside on a memory device of remote computer 248. For purposes of illustration, application programs and other executable program components, such as the operating system, are illustrated herein as discrete blocks, although it is recognized that such programs and components reside at various times in different storage components of the computer system 202, and are executed by the data processor(s) of the computer.

Exemplary Architecture for Managing and Enforcing Software Licenses

Figure 3:
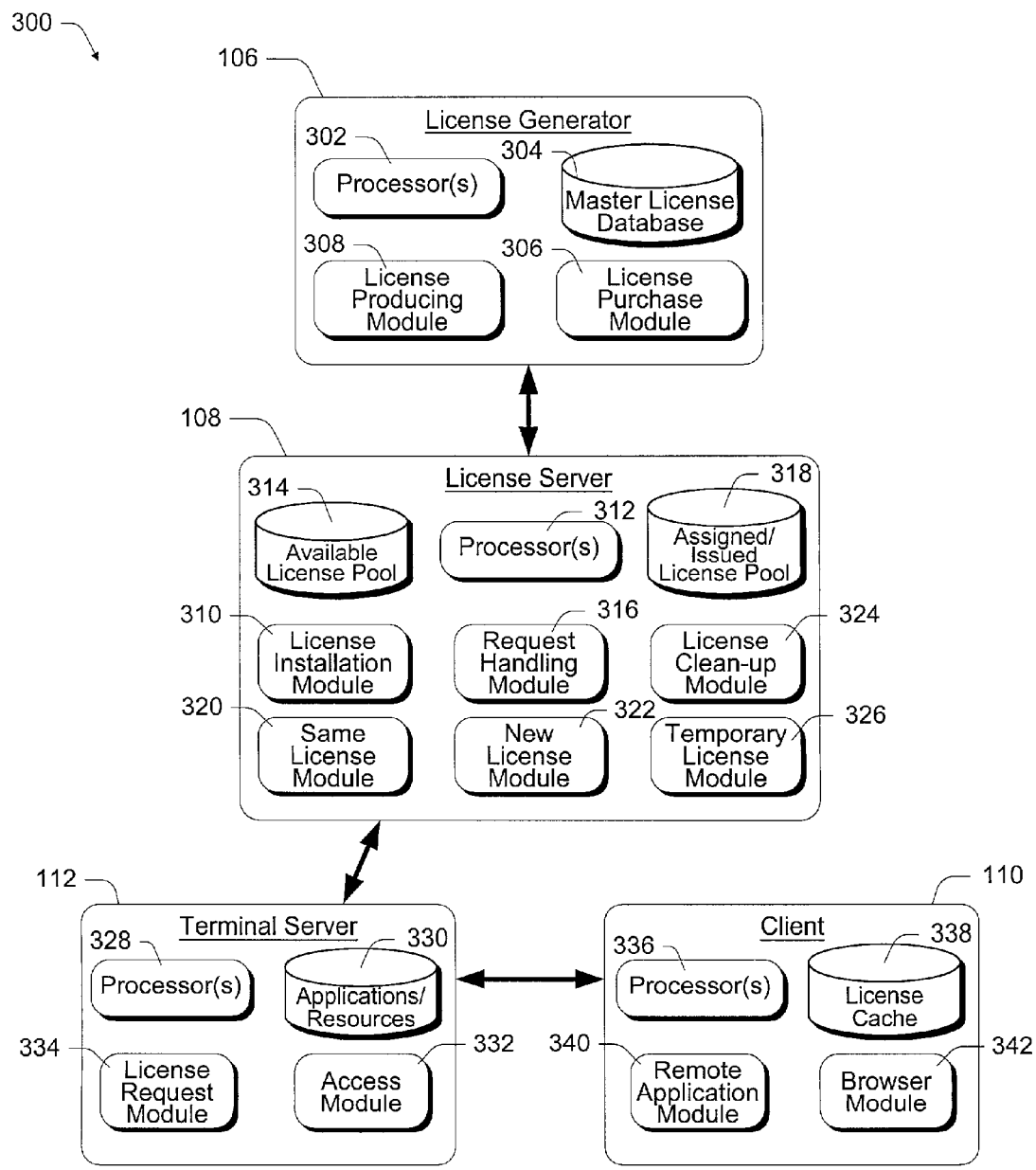
FIG. 3 illustrates components within an exemplary software licensing system and various software and hardware elements included in the components.

The invention achieves management and enforcement of software licenses within the exemplary software licensing system 100 of FIG. 1 through the exemplary software/hardware architecture 300 shown in FIG. 3. FIG. 3 illustrates components of the exemplary software licensing system 100 and basic software and hardware architecture elements within these components which operate to implement the invention. The licensing system 100 components illustrated in FIG. 3 include the license generator 106, a license server 108, a terminal server 112, and a client 110. The architecture elements shown within each of the system 100 components are a mechanism for facilitating the following functional description of the system 100 components, and are not meant to be a limitation of the architecture of any component. As noted above, the computing environment 200 of FIG. 2 may be a suitable implementation of these system 100 components, but it is not the only possible implementation, nor is it intended to suggest any limitation as to the scope of use or functionality of the system 100 components.

In general, the license generator 106 produces software licenses for a fee, and the license server 108 consumes the licenses by installing them. The licenses are typically produced in license packs which each contain one or more licenses. The license server 108 can then distribute a license to a client 110. This is usually, although not necessarily, done with the help of the terminal server 112. The client 110 then uses the license to gain access to the resources provided by the terminal server 112.

Referring to FIG. 1, the entity or company 104 that owns or is responsible for the license server 108, registers itself with an independent certifying authority that is trusted by both the company 104 and the licensing clearinghouse 102. The company 104 submits information identifying itself and various license servers 108 to the certifying authority. The certifying authority issues a certificate to the company 104 after verifying that the company 104 is a real entity and that the identification information is true and accurate. The certificate contains a public key of the company 104 (or particular license server 108), which is signed by the certifying authority. This certificate becomes the license server's 108 certificate which it uses when requesting a license pack from the licensing clearinghouse 102. Similarly, the licensing clearinghouse 102 also registers with the certifying authority to receive a public certificate. The clearinghouse 102 certificate contains the clearinghouse's public key, signed by the certifying authority. Details of the registration and verification process through the certifying authority with respect to the company 104 (or its particular license server 108) and the licensing clearinghouse 102 are described in the co-pending patent application entitled, "System and Method for Software Licensing", incorporated by reference above.

Referring now to FIG. 3, the license generator 106 includes processor(s) 302, a master license database 304, a license purchase module 306, and a license producing module 308. The license purchase module 306 executes on processor(s) 302 to receive a purchase request from the license server 108 to purchase software licenses. Typically the purchase request is for one or more software license packs. The purchase request includes information pertaining to the licenses and license server 108. For example, the purchase request might contain such information as a license server ID, the license server's certificate (which contains the license server's public key), a client's platform type, the quantity of licenses desired, a product ID, and a list of features that the licenses should enable. Additional information about a company 104 (e.g., name, contract number, etc.) may also be requested for purposes of tracking and report generation. The license purchase module 306 stores this information in the master license database 304.

In response to the request to purchase licenses, the license producing module 308 executes on processor(s) 302 to generate one or more license packs, each of which contains a set of one or more non-assigned software licenses purchased from the license clearinghouse 102. The license generator 106 creates licensing packs and transports the licensing packs to the license server 108 in a secure way that prevents them from being copied and installed on multiple license servers 108 or being applied multiple times on the same server 108. Details of the manner in which these security measures are accomplished can also be found in the co-pending patent application entitled, "System and Method for Software Licensing", incorporated by reference above.

The license server 108 has a license installation module 310 which executes on processor(s) 312 to install the license pack(s) received from the license generator 106 on a database having an available license pool 314. The license installation module 310 may also be used to order the license packs through the license purchase module 306, when such purchase requests are made electronically. The license server 108 has a request handling module 316 which executes on processor(s) 312 to receive license requests from clients 110, typically through a terminal server 112. Upon receiving a license request, the request handling module 316 stores client identification information in an assigned license data pool 318. This information, along with information on what licenses are assigned to a client 110, determines whether a client 110 needs an update/renewal of its "same" license, issuance of a new license, or issuance of a temporary license. Upon receiving a license request, the request handling module 316 compares information from the requesting client 110 with information already stored in the assigned license data pool 318 to determine the license status of the client 110.

The "same" license module 320 is called to execute on processor(s) 312 anytime a client 110 is recognized as either needing its current license updated, or needing a new license. Therefore, each time the license server 108 receives a request, the "same" license module 320 executes to determine if the client 110 has been previously licensed by accessing and comparing client identification and license status information previously stored in the assigned license pool database 318. If the client has not been previously licensed, the new license module 322 provides a new license to the client 110 as described below. However, if the client has been previously licensed, and still possesses its license, the "same" license module 320 provides a new expiration date and reissues this "same" license to the client. This situation arises whenever a licensed client 110 accesses the terminal server 112 during a "license update period" prior to the expiration date of the client's license. Each license has a "license update period", which is typically a period of about 7 days prior to the expiration date of a license in which current licenses are updated with new expiration dates and reissued to the same client.

In addition, if the client 110 has been previously licensed, but no longer possess its license, the "same" license module 320 will then search the available license pool 314 for this "same" license in order to update and reissue it to the client. If the "same" license cannot be found in the available license pool 314, then the new license module 322 executes to provide a new license to the client 110, as described below.

A previously licensed client 110 that no longer possesses its license, has either lost its license due to the client machine being refreshed (e.g. hard disk reformat, reinstallation, etc.), or it has not accessed a terminal server 112 during the "license update period", and the license has expired. Expired licenses are returned to the available license pool 314 by the license clean-up module 324. The license clean-up module 324 executes daily to review licenses in the assigned license pool 318 and return any assigned licenses to the available license pool 314 when they reach their expiration date. Therefore, when a client's license is lost, if that "same" license is not in the available license pool 314 when the client next accesses a terminal server 112, then the license has either not reached its expiration date and has thus not been returned to the available pool 314 (illustrating that the license was lost), or, it has already reached its expiration date (without being "updated" during its "license update period"), has been returned to the available pool 314, and has been reissued to a different client 110 that needed a license.

The new license module 322 executes to search the available license pool 314 for a new license which it provides to a client 110 whenever the client has never been issued a license, or whenever the client's "same" license is not available. Licenses in the available license pool 314 can be any available license. Therefore, any license previously issued to a client 110 that has been returned by the license clean-up module 324 to the available license pool 314 upon its expiration, is subject to being given to a different client. When a new license is available from the available license pool 314, the new license module 322 sets an expiration date and issues the license to the requesting client 110. When a new license is not available, a temporary license may be issued to the client 110 as discussed below.

The temporary license module 326 executes to provide a temporary license to a previously licensed client 110 which has lost its permanent license prior to the expiration date of the permanent license. The temporary license module 326 provides the temporary license when the client 110 is unable to have its "same" permanent license reissued, and is unable to have a new permanent license issued (i.e. no new licenses are available from the available license pool 314). The temporary licensing feature ensures that a company 104 does not have to purchase more licenses than it has clients 110 using the licenses. The temporary license module 326 accesses client identification and license status information from the assigned license pool database 318, and determines whether the client has previously been issued a temporary license. If the client already has a temporary license, no temporary license is issued, and the client is permitted access to the terminal server 112 because the temporary period of the temporary period has not yet run out. If the client has not yet been issued a temporary license, then the temporary license module 326 issues a temporary license having a temporary period during which the client is permitted access to the terminal server 112. Temporary licenses are non-renewable, and only one temporary license is issued to a client 110. If the temporary period runs out prior to a client receiving either its "same" permanent license or a new permanent license from the available license pool 314, then the client is thereafter denied access to the terminal server 112 until a permanent license becomes available.

The period of time over which the temporary license provides terminal server 112 access to a client 110, for example, a 90 day period, is a reasonable period designed to allow long term management of the license server 108. In addition, all permanent license expiration dates (i.e., for "same" licenses and new licenses) set as discussed above, are set to provide a permanent license period that is less than the temporary license period. In this way, the system ensures that prior issued permanent licenses which expire (e.g., because they are wiped from a client machine, or because a client does not access the terminal server 112 during the "license update period"), are returned to the available license pool 314 by the license clean-up module 324 in time to be re-issued to their previous client machines.

Therefore, in an exemplary implementation, all permanent license expiration dates are randomly selected to provide a licensing period which extends from 52 to 89 days beyond the date the license is issued or reissued. The randomized expiration date is used to prevent all the clients 110 from reaching their respective "license update periods" at the same time, and thus, results in an even distribution of the licensing load against the license server 108.

The terminal server 112 architecture includes processor(s) 328, a database having application programs and other resources 330, an access module 332, and a license request module 334. The access module 332 executes on processor(s) 328 to permit or reject client 110 access to the resources 330 on the terminal server 112. The access module 332 first determines whether a client 110 which connects to the terminal server 112 has been previously licensed. If a connecting client 110 has not been previously licensed, the license request module 334 executes to request a new license from the license server 108 for the client. If a new license is provided to the client 110 as discussed above, the client is granted access to the terminal server 112 by the access module 332. Otherwise, client access to the terminal server 112 is rejected.

If a licensed client 110 connects to the terminal server 112 prior to the "license update period", the access module 332 immediately permits access to the terminal server 112. However, if a licensed client 110 connects to the terminal server 112 during the "license update period", the license request module 334 is called to request an update to the client's 110 permanent license from the license server 108. If the license server 108 is unavailable, the access module 332 permits access to the terminal server 112 anyway, since the client's permanent license has not yet expired. Otherwise, the license request module 334 requests an update to the client's permanent license from the license server 108, which reissues the client's 110 "same" permanent license with an updated expiration date, as discussed above. The updated "same" license is pushed down to the client 110, and the client is permitted access to the terminal server 112.

The license request module 334 also initiates a request to the license server 108 when a previously licensed client 110 connects to the terminal server 112 on or after the expiration date of the client's permanent license. The license request made to the license server 108 should result in the issuance of the "same" permanent license or a new permanent license as discussed above, and the client should be granted access to the terminal server 112. However, if a permanent license is not available from the license server 108, the client 110 will be denied access to the terminal server 112 resources. Additionally, in the event a client 110 has previously been issued a temporary license, and the temporary period for the temporary license has run out, the client 110 will be denied access to the terminal server 112 resources if the "same" permanent license or a new permanent license is not available from the license server 108.

Client 110 architecture includes processor(s) 336, a license cache 338, a remote application module 340, and a browser module 342. A client 110 wanting to access a terminal server 112 for resources or for remote execution of applications 330, connects to the terminal server 112 through running a typical web browser 342. Upon connecting with the terminal server 112, if the client 110 possesses a license (i.e., a current license, an expired license, or a temporary license) in its license cache 338, it presents the license to gain access to the terminal server 112. The terminal server 112 evaluates the license as discussed above, and permits or denies access to the client 110 on this basis. Otherwise, if the client 110 is not licensed, and thus presents no license when connecting to the terminal server 112, the terminal server 112 attempts to retrieve a new license for the client 110, also as discussed above. Once the client 110 has access to the terminal server 112, a remote application module 340 may execute on processor(s) 336 to run various applications 330 provided on the terminal server 112. Although clients 110 may be implemented as many different kinds of computers, they only require enough processing 336 capability to connect to the terminal server 112 and implement the remote application module which facilitates the remote execution of applications 330 on the terminal server 112. All the applications 330 run at the server with server-based processing.

Exemplary Method for Managing and Enforcing Software Licenses

Figure 4A:
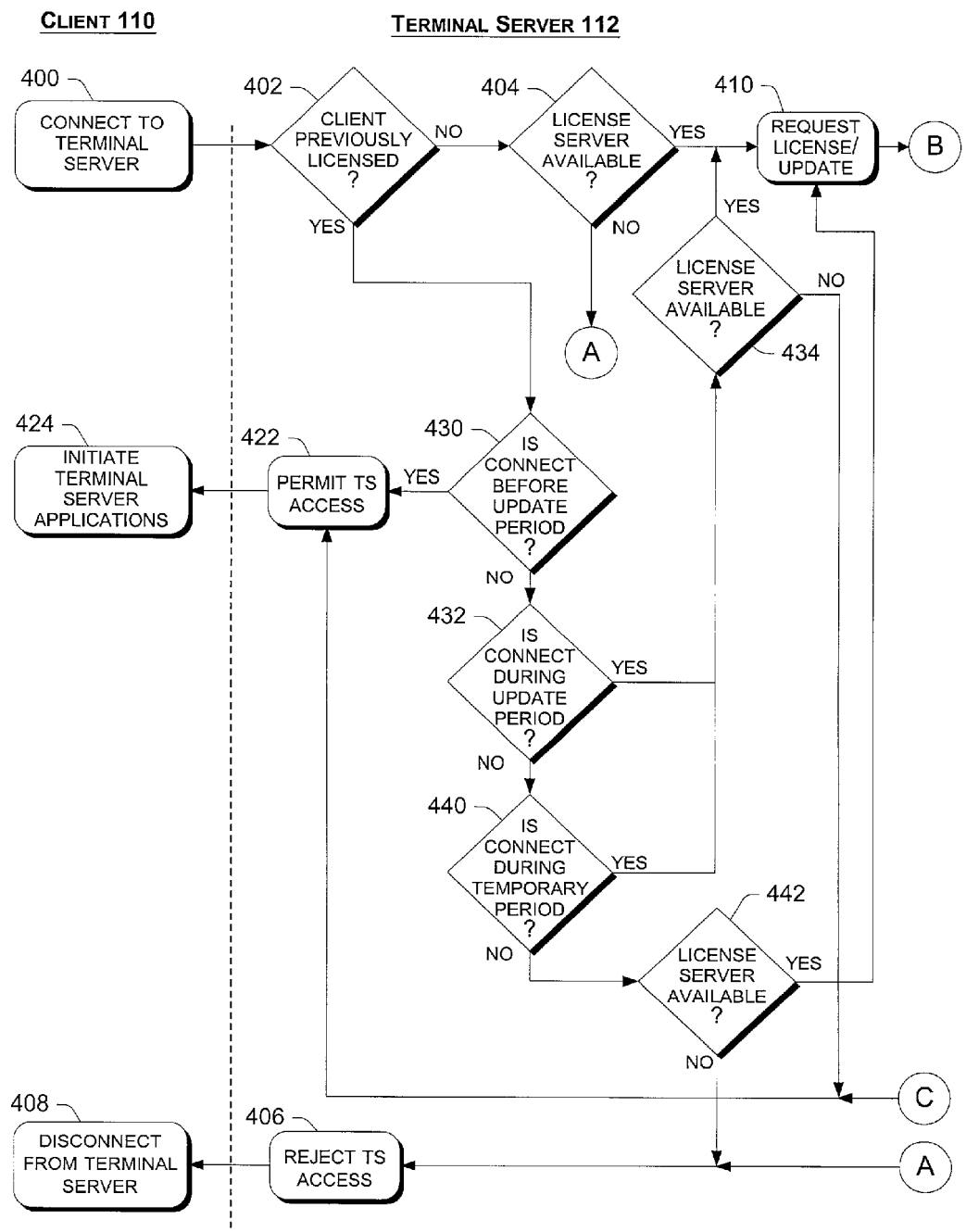
FIG. 4A is a flowchart illustrating the general method of managing and enforcing software licenses implemented by an exemplary software licensing system.
Figure 4B:
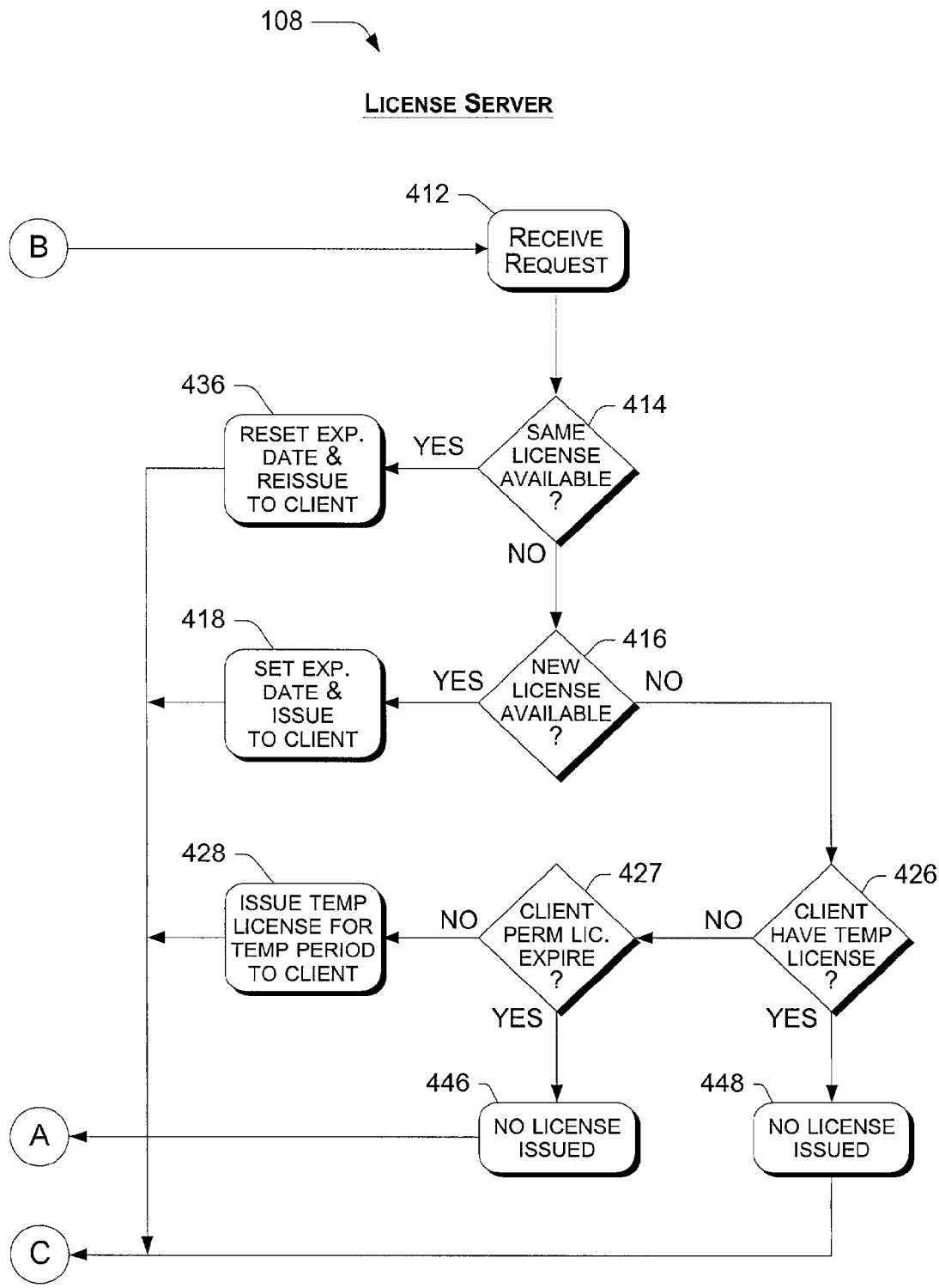
FIG. 4B is a continuation of the FIG. 4A flowchart illustrating the general method of managing and enforcing software licenses implemented by an exemplary software licensing system.
Figure 4C:
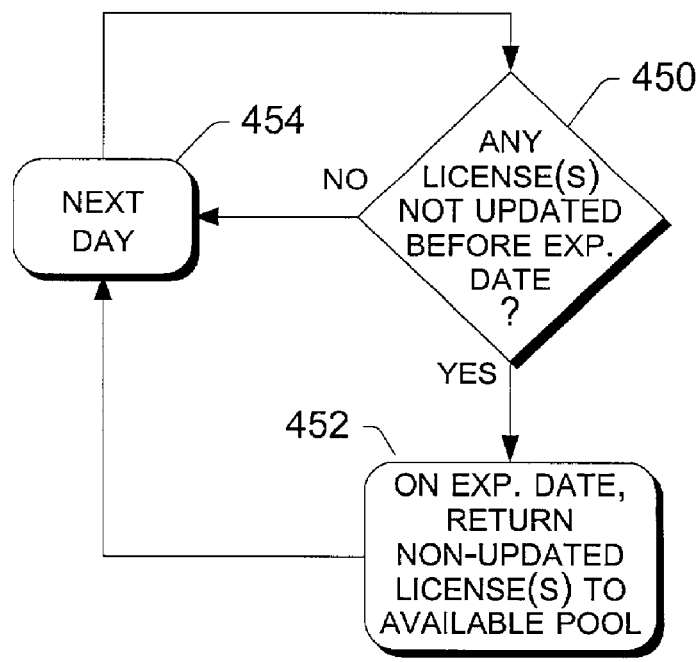
FIG. 4C is a continuation of the FIG. 4A flowchart illustrating the general method of managing and enforcing software licenses implemented by an exemplary software licensing system.

Having introduced an exemplary software licensing system and architecture, an example method of operation will be presented with primary reference to FIG. 4 (i.e., FIGS. 4A, 4B, and 4C). FIG. 4 is a flowchart illustrating the general method of managing and enforcing software licenses implemented by the exemplary software licensing system and architecture of FIGS. 1 & 3. Specifically, the flowchart of FIG. 4 illustrates this method at a beginning point which assumes that the license server 108 has already installed software licenses purchased from the license generator 106, and thus does not illustrate transactions between the license generator 106 and license server 108 which are discussed above with respect to FIG. 3. To help clarify an overall exemplary method of operation, various operating scenarios will be individually described, each of which illustrates a portion of the overall method.

First of all however, as shown in FIG. 4C, an ongoing aspect of the invention includes issuing permanent licenses with expiration dates to clients 110 and returning the licenses to an available license pool 314 on their expiration dates if they have not been updated. Thus, as illustrated by operations 450, 452, and 454 of FIG. 4C, a basic part of the overall method occurring on a daily basis, includes the license server 108 reviewing data in an assigned license pool 318 and returning any expiring licenses to the available license pool 314. For example, a permanent license that is wiped off of a client machine (e.g., due to an employee turnover) will not end up having its expiration date updated, but instead will expire and be returned to the available license pool 314 on its expiration date. In such a case, if this client machine connects prior to the expiration date, it will be issued a temporary license, valid for a period of time which ensures that the client machine will be, ideally, issued the same permanent license once that same permanent license expires and is returned to the available license pool 314. In order for this to occur, expiration dates for permanent licenses are set such that license periods are less than the length of the temporary periods provided by temporary licenses. An example would include setting the temporary license period to 90 days, while setting permanent license expiration dates so that all permanent licenses expire randomly between 52 and 89 days after the date they are issued. This general concept of license expiration dates being set so that temporary license periods outlast permanent license periods, is true with respect to each of the scenarios discussed below.

Referring to FIG. 4A, each scenario begins at operation 400 with a client 110 connecting to a terminal server 112 in an attempt to remotely execute applications 330 or otherwise access terminal server resources 330. A first scenario involves a client 110 that has no license. Upon connection, the terminal server 112 determines at operation 402 whether the connecting client 110 has a license. Since the client 110 has no license, the terminal server 112 will assist the client 110 in retrieving a new license from the license server 108. First, the terminal server 112 determines if the license server 108 is available at operation 404. If the license server 108 is not available, the terminal server 112 rejects access by the client 110 at operation 406, and the client 110 disconnects at operation 408. However, if the license server 108 is available, the terminal server 112 submits a license request at operation 410, which the license server 108 receives at operation 412 (FIG. 4B). At operation 414, the license server 108 determines that the client 110 does not need a license update, but rather needs a new license. Therefore, the license server 108 locates a new permanent license in an available license pool 314 at operation 416, and sets an expiration date for the new license and issues the new license to the client at operation 418. Assuming at operation 414, that the client 110 had previously been issued a license, but that the license had been lost, the license server 108 would first attempt to locate this "same" license in the available license pool 314 prior to searching for a new permanent license. However, in the current scenario there is no previously issued license, and the new permanent license is pushed down to the client 110 through the terminal server 112. The client 110 is permitted terminal server access at operation 422 (FIG. 4A). The client 110 may then initiate remote terminal server applications 330 or otherwise access terminal server resources 330 within the limits of its license at operation 424.

In the event the license server 108 is unable to locate a license in the available license pool 314 at operation 416 (FIG. 4B), the license server 108 determines whether the client 110 has been issued a temporary license at operation 426. The license server 108 additionally determines at operation 427, that the client 110 has not previously been issued a permanent license that has been expired. Since the client 110 has not been issued a temporary or permanent license in this first scenario, and a new permanent license is not available, the license server 108 will issue a temporary license to the client 110 at operation 428. The temporary license is pushed down to the client 110 through the terminal server 112, and the client 110 is permitted terminal server access at operation 422 (FIG. 4A).

A second scenario involves a client 110 that has recently received a permanent license which has not yet reached its expiration date, and which is in a period prior to a "license update period". A "license update period" is a short predetermined period prior to the expiration date of a license, typically about a 7 day period, in which the terminal server 112 will attempt to have the license updated through the license server 108. In the second scenario, a licensed client 110 connects to a terminal server 112 prior to the "license update period". The terminal server 112 determines at operation 402, that the connecting client 110 has previously been issued a permanent license. The terminal server 112 determines at operation 430 whether the client is connecting prior to the "license update period". If this is true, as in the current scenario, the terminal server 112 permits access to the client 110 at operation 422, and the client 110 may then initiate remote terminal server applications 330 or otherwise access terminal server resources 330 within the limits of its license at operation 424.

A third scenario involves a client 110 that has recently received a permanent license which has not yet reached its expiration date, but which is within the "license update period". The terminal server 112 determines at operation 402 that the connecting client 110 has been issued a license, and at operation 430, that the client is not connecting prior to the "license update period". At operation 432, the terminal server 112 determines if the client is connecting during the "license update period". Since, in the current scenario, the client 110 is connecting during the "license update period", the terminal server 112 automatically tries to update the client's permanent license through the license server 108. If the license server 108 is not available (operation 434), the terminal server 112 permits access to the client 110 at operation 422, since it knows that the client license has not yet expired. The client 110 may then initiate remote terminal server applications 330 or otherwise access terminal server resources 330 within the limits of its license at operation 424.

However, if the license server 108 is available (operation 434), the terminal server 112 automatically requests an update for the client license at operation 410. The license server 108 receives the request at operation 412 (FIG. 4B), and determines at operation 414 that the client 110 already has a permanent license, and is thus requesting that its "same" permanent license be updated. The license server 108 therefore does not need to find a new license for the client 110, but instead simply resets the expiration date and reissues the "same" license to the client 110 at operation 436. The updated "same" license is pushed down to the client 110 through the terminal server 112, and the client 110 is permitted terminal server access at operation 422.

A fourth scenario involves a client 110 that has received a permanent license which is now either at or beyond its expiration date. This scenario arises when a previously licensed client 110 does not connect with a terminal server 112 while in possession of its license during the "license update period". This can happen under at least two sets of circumstances. The first, and most common, is when an employee assigned to the licensed client machine 110, leaves the company 104 or moves to a different position within the company 104. The client machine 110 is then transferred to a replacement employee and its hard disk, containing the permanent license, is reformatted, reinstalled, or otherwise refreshed, such that the license is wiped off the machine. It is therefore not possible for the client machine 110 to connect with a terminal server 112 while in possession of its license during the "license update period". The second set of circumstances is simply where an employee to whom the client machine 110 is assigned, does not connect with a terminal server 112 during the "license update period", even though the license is still present on the client machine 110. In either case, the permanent license reaches its expiration date.

In this fourth scenario, the terminal server 112 determines at operation 402 that the connecting client 110 has previously been licensed, that the connection is not prior to the "license update period" (operation 430), that the connection is not during the "license update period" (operation 432), and whether the connection is during the temporary period granted by a temporary license (operation 440). Under the current scenario, since the client 110 has not been issued a temporary license, the client 110 cannot be connecting during a temporary period granted by a temporary license. Therefore, the terminal server 112 knows that either the client's permanent license has expired, or the client has been issued a temporary license whose temporary period has run out. The terminal server 112 attempts to update the client's permanent license or retrieve a new permanent license through a request to the license server 108. However, first the terminal server 112 checks to see if the license server 108 is available at operation 442. If the license server 108 is not available, the terminal server 112 rejects access to the client 110 at operation 406.

If the license server 108 is available (operation 442), the terminal server 112 automatically makes a license request at operation 410. The license server 108 receives the request at operation 412 (FIG. 4B), and determines at operation 414 that the client 110 has been licensed before, but that its permanent license has expired. Therefore, the license server 108 searches the available license pool 314 and attempts to locate the client's expired or "same" permanent license (operation 414). If this "same" license has not been issued to a different client, it will be available in the available license pool 314 for updating and issuing to the same client. The license server 108 would therefore reset the expiration date and reissue the "same" license to the client 110 at operation 436. The updated "same" license would then be pushed down to the client 110 through the terminal server 112 to the client 110.

If the license server 108 is unable to locate the "same" permanent license (meaning that this license was already reissued to a different client), it then searches for any new permanent license (operation 416) in the available license pool 314 and issues a new license with a new expiration date at operation 418. However, when a new license is not available, the license server 108 determines if the client has a temporary license, at operation 426. If the client 110 has not yet been issued a temporary license, as in the current scenario, the license server 108 determines at operation 427 if the client's permanent license expired. If the client's permanent license has expired, as in the current scenario, no license is issued to the client 110 (operation 446), and the client is denied access to the terminal server 112 at operation 406 (FIG. 4A). If however, the client's permanent license had not yet expired, the license server 108 would know that the license was either in an update period, or had been lost. Since a permanent license is not available, the license server 108 would issue a temporary license with a temporary access period at operation 428. The temporary license would be pushed down to the client 110 through the terminal server 112, and the client 110 permitted terminal server access at operation 422.

In a final scenario, a client 110 that has received a temporary license connects to the terminal server 112. As similarly described above, the terminal server 112 determines at operation 402 that the connecting client 110 has previously been licensed, that the connection is not prior to the "license update period" (operation 430), that the connection is not during the "license update period" (operation 432), and whether or not the connection is during the temporary period granted by a temporary license (operation 440). Under the current scenario, the client 110 has been issued a temporary license, so the temporary period may still be good or it may have run out. Whether the client 110 connection is during the temporary period or after the temporary period, the terminal server 112 attempts to update the client's permanent license or retrieve a new permanent license through a request to the license server 108. However, first the terminal server 112 checks to see if the license server 108 is available, through operation 442 if the connection is after the temporary period, or through operation 434 if the connection is during the temporary period. If the connection is after the temporary period and the license server 108 is not available (operation 442), the terminal server 112 rejects access to the client 110 at operation 406. If the connection is during the temporary period and the license server 108 is not available (operation 434), the terminal server 112 permits access to the client 110 at operation 422, since it knows the client 110 is still within the temporary period of its temporary license.

Whether the client 110 connection is during the temporary period or after the temporary period, if the license server 108 is available (operations 442 and 434), the terminal server 112 automatically makes a license request at operation 410. The license server 108 receives the request at operation 412 (FIG. 4B), and determines at operation 414 that the client 110 has been licensed before, but that it now has a temporary license and therefore needs a permanent license. Therefore, the license server 108 searches the available license pool 314 and attempts to locate the client's "same" permanent license (operation 414). If this "same" license has not yet expired, it will not have been returned yet to the available license pool 314, and thus will not be available. However, if this "same" license has expired but has not yet been issued to a different client, it will be available in the available license pool 314 for updating and issuing to this same client. The license server 108 would therefore reset the expiration date and reissue the "same" license to the client 110 at operation 436. The updated "same" license would then be pushed down to the client 110 through the terminal server 112 to the client 110.

If the license server 108 is unable to locate the "same" permanent license (meaning that this license has not yet expired, or, that it has expired but has already been reissued to a different client), it then searches for any new permanent license (operation 416) in the available license pool 314, and issues a new license with a new expiration date at operation 418. If a new license is not available, the license server 108 then determines, in this scenario, that the client 110 has a temporary license, at operation 426. Since the client 110 already has a temporary license, no license is issued (operation 448), and the terminal server 112 permits access to the client 110 at operation 422, since the client 110 is still within the temporary period of its temporary license.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method performed on a processor of managing a software license, comprising:

issuing a software license to a client, the software license entitling the client to access software resources, the software license having an expiration date, the software license being identified as a previously issued software license;

receiving a license request from the client;

determining that the expiration date of the previously issued software license has been reached without the client making a license request because the previously issued software license has been lost or because the previously issued software license is not lost but has not been used in a license update period, resulting in the return of the previously issued software license to an available pool of software licenses;

reissuing the previously issued software license to the client if the previously issued software license is available because the previously issued software license has been returned to the available pool of software licenses and has not been issued to another client, the reissued software license having a new expiration date;

issuing a new software license to the client if a new software license is available and the previously issued software license is not available, the new software license having a new expiration date; and denying the client access to software resources if the previously issued software license is not reissued and a new license is not issued.

2. A method as recited in claim 1, wherein the software resources are located on a terminal server.

3. Computer-readable media having computer-readable instructions for performing the method as recited in claim 1.

4. A system for managing a software licensing, comprising:

an available license pool database to store software licenses;

a license server configured to issue a software license to a client machine, the software license entitling the client machine to access software resources, the software license having an expiration date, the software license being identified as a previously issued software license;

a terminal server configured to receive a license request from the client machine;

the licenser server configured to determine that the expiration date of the previously issued software license been reached without the client machine making a license request because the previously issued software license has been lost or because the previously issued software license is not lost but has not been used in a license update period, resulting in the return of the previously issued software license to the available pool of software licenses;

the license server further configured to reissue the previously issued software license to the client machine if the previously issued software license is available because the previously issued software license has been returned to the available pool of software licenses and has not been issued to another client machine, the reissued software license having a new expiration date; and issue a new software license to the client machine if a new software license is available and the previously issued software license is not available, the new software license having a new expiration date; and deny the client machine access to software resources if the previously issued software license is not reissued and a new license is not issued.

\* \* \* \* \*